Patented Feb. 3, 1948

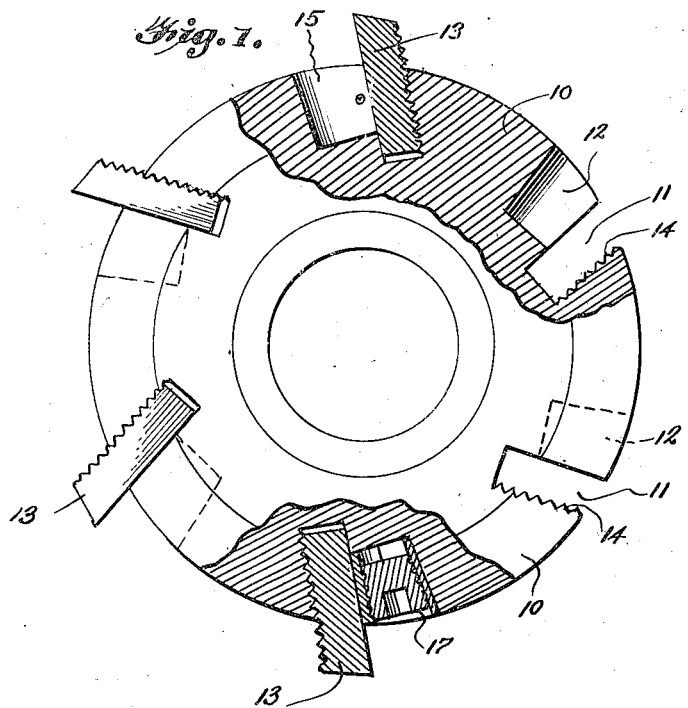
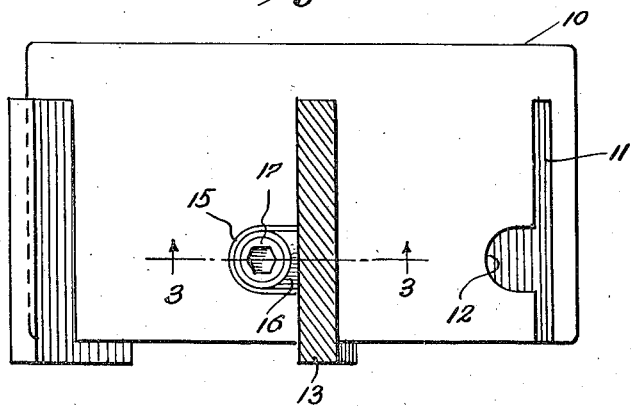
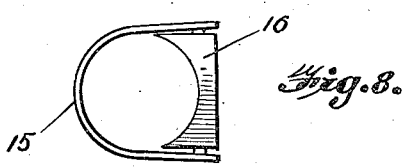

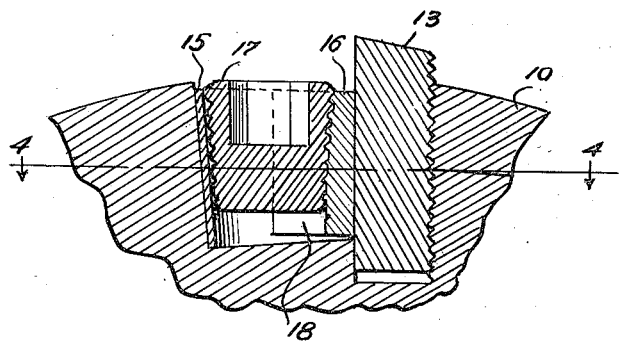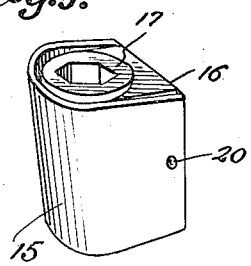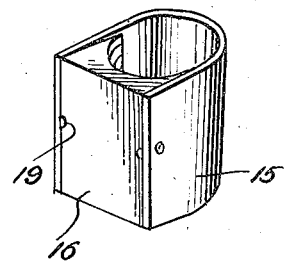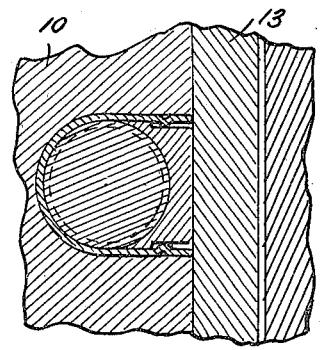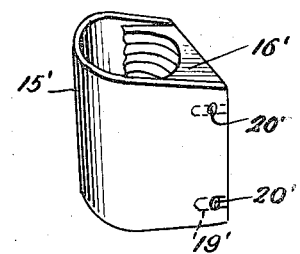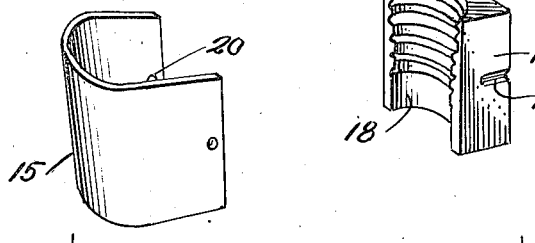

2,435,287

UNITED STATES PATENT OFFICE 2,435,287

CUTTING TOOL

Frank P. Miller, deceased, late of Meadville, Pa., by Robert W. Thomas and Florence G. Miller, executors, Meadville, Pa., assignors to Robert W. Thomas, Meadville, Pa.

Application May 12, 1944, Serial No. 535,348

9 Claims. (Cl. 29—105)

The present invention relates to cutting tools of the inserted blade type, and more particularly to an improvement in the means for securing the blades in the tool body.

In the tools of the prior art, difficulty has been experienced with hardening the tool body sufficiently to withstand the pressure and frictional action of the blade securing or clamping means. It has been found that the large mass of the material of the tool body cannot be made hard enough to withstand the stress and wear incident to the use of a blade clamping mechanism.

An important object of the present invention is to provide a blade securing means which will not require hardening of the tool body to prevent damage to the body from the functioning of the blade securing means.

Another object of the invention is to provide a blade securing device which is of simple construction, which is inexpensive to manufacture, and which is strong and efficient in use.

Other objects and advantages of the invention will be apparent during the course of the following description.

In the accompanying drawings which form a part of this specification,

Figure 1 is an elevation of a tool holder embodying the present invention, parts being shown in section;

Figure 2 is a plan view thereof;

Figure 3 is a fragmentary sectional view taken on the line 3—3 of Figure 2;

Figure 4 is a sectional view on the line 4—4 of Figure 3;

Figure 5 is a perspective view of the blade securing unit, looking toward the liner;

Figure 6 is a perspective view of the clamping unit, looking toward the blade engaging face of the shoe, with the lock screw removed;

Figure 7 is an exploded perspective of the liner and shoe;

Figure 8 is a plan view of the liner and shoe as they are being assembled, and

Figure 9 is a perspective view of a slightly modified form of the liner and shoe.

In the drawings, wherein for the purpose of illustration are shown preferred embodiments of the invention, the numeral 10 designates a cylindrical tool body having blade receiving slots 11 in its periphery. A recess 12 is disposed alongside of each slot 11 and breaks into the slot intermediate the ends thereof. The rear portion of the recess 12 is semi-circular in shape and is connected to the slot 11 by straight, substantially parallel side walls. As shown in Figures 1 and 3, the rear wall of the recess converges inwardly somewhat with respect to the plane of the slot.

A blade 13 is adjustably mounted in each of the slots 11 and has its side removed from the recess 12 serrated to engage serrations 14 in the opposed wall of the slot in the usual manner.

The locking or clamping device of this invention comprises a liner 15, a shoe 16, and a tapered locking screw or wedge 17 which are assembled to form a unit which is received in the recess 12, the shoe being forced into engagement with the blade 13 by the action of the tapered locking screw.

The liner 15 is of thin, hardened steel having the same shape as the recess 12, that is, substantially U-shaped in cross-section, and is adapted to fit snugly in the recess. The inner surface of the liner is smooth and unthreaded, and its curved portion has a constant radius from end to end of the liner. Due to the inclination of the rear wall of the recess 12 with respect to the plane of the blade, the curved wall of the liner will assume the same inclination, as will be seen from an inspection of Figure 3. The bottom plane of the liner is disposed at a right angle to the axis of the curved portion of the liner, while the top plane is at an angle less than a right angle so that the liner may conform to the inclination of the rear wall of the recess and to the periphery of the tool body.

The shoe 16 is of a width to fill the space between the sides or arms of the liner 15 and has a lock screw receiving groove 18 extending from end to end thereof and cooperating with the curved portion of the liner to form a lock screw receiving bore. The shoe is substantially rectangular in shape with the semi-circular groove 18 in one face and each of the sides of the shoe is provided intermediate its ends with a depression or groove 19, which opens onto the blade engaging face of the shoe and is closed at its opposite end, to receive inwardly extending knobs or projections 20 punched up from the side walls of the liner. In assembling the liner and shoe, the side walls of the liner must be sprung outwardly, as shown in Figure 8, for the knobs 20 to pass over the edges of the shoe into the grooves 19. The knobs secure the parts together by engaging in the grooves 19, the grooves being sufficiently long to permit movement of the shoe relative to the liner and in a direction toward and away from the blade.

The lock screw or wedging element 17 is adapted to extend into the bore formed by the groove 18 in the shoe and the curved portion of the liner to force the shoe laterally into engagement with the blade 13 to secure the blade in its slot 11. The groove in the shoe is threaded to engage the threads of the lock screw, while the curved wall of the liner is unthreaded. The threads on the lock screw and the shoe groove are of the type disclosed in the Miller Patent No. 2,128,571, of August 30, 1938, in which the lock screw threads have a pitch line parallel to the axis of the screw with the tops of the threads turned down or ground off in increasing amounts as the leading end of the screw is approached to produce a taper on the tops of the threads. The threads of the groove 18 are complemental to the threads of the screw. The groove threads lead the screw into locking position and also keep the screw from falling out when the screw is in a loose position. The flat tops of the threads of the taper screw engage the smooth surface of the liner and produce a large area of contact between the screw and liner. This generous bearing area, coupled with the fact that the liner is hardened, will prevent any undue injury to the contact surface of the liner. The taper of the threads on the screw coacts with the inclination of the curved wall of the liner with respect to the plane of the blade to produce the clamping pressure of the shoe against the blade as the screw spreads the shoe out of the liner.

When the liner, shoe and taper screw are assembled, as in Figures 3, 4 and 5, they form a compact integrated unit held together by the coacting knobs 20 and grooves 19. The unit is preferably removably arranged in the recess 12 and held therein by the snugly fitting liner and the tendency for the arms of the liner to spring outwardly against the walls of the recess, but the liner may be permanently secured in the recess by means of brazing, cementing or a peening operation, if so desired. The construction of the clamping unit is simple and it is efficient in operation and inexpensive to produce. The hardened steel liner may be made by a punch press operation at a very nominal cost. The shoe members may be made in pairs on a screw machine or lathe, and subsequently cut into halves to form two shoes from one piece.

The form of invention shown in Figure 9 is the same as the previously described embodiment except that each arm of the liner 15' is formed on its inner face with a pair of vertically spaced knobs or projections 20' which seat in similarly arranged grooves 19' in the side edges of the shoe 16' to provide the interlocking connection between the liner and shoe.

The invention is illustrated in connection with a serrated blade and slot. However, it can obviously be used to clamp a plain blade in a plain slot because the clamping unit exerts no forces which would tend to disturb the longitudinal or radial position of the blade.

The form of the recess in the body is extremely simple, easily produced and not subjected to wear. The combination of the taper threaded screw and the inclined walls of the recess and liner produces a powerful compound wedging action. The effective angle between the blade and the rear wall of the liner is less than a slipping angle so that all pressure is directed toward the blade. The spring liner snugly retains the clamping unit in the recess when the blade is removed, but the entire unit may be easily removed for replacement or other purposes. The clamping unit obtains maximum contact with the blade relative to the size of the recess.

While there is shown and described the preferred embodiments of the invention, it is to be understood that various changes in the size, shape and arrangement of parts may be resorted to without departing from the spirit of the invention or the scope of the subjoined claims.

Having thus described the invention, what is claimed is:

1. A device of the character described comprising a substantially U-shaped liner having substantially parallel arms, a shoe member disposed between the arms of the liner and having a groove cooperating with the curved portion of the liner to form a plug receiving bore, and a tapered screw plug in said bore adapted to force the shoe away from the curved portion of the liner, said shoe groove having threads complementing the threads on the tapered screw plug, and projections carried by the inner faces of the liner arms, said shoe having elongated grooves to slidably receive said projections.

2. A device of the character described comprising a substantially U-shaped liner having substantially parallel arms, a shoe member disposed between the arms of the liner and having a groove cooperating with the curved portion of the liner to form a plug receiving bore, a tapered screw plug in said bore adapted to force the shoe away from the curved portion of the liner, said shoe groove having threads complementing the threads on the tapered screw plug, said liner comprising a thin, hardened steel member, and projections struck up from the liner arms on the inner faces thereof, said shoe having its sides provided with elongated grooves to receive the projections and secure the shoe and liner together while permitting relative movement therebetween.

3. A clamping unit for an inserted cutter blade comprising a substantially U-shaped hardened steel liner, a shoe member bridging the free end portions of the arms of the liner, coacting means on said liner and shoe member providing an interlocking slidable connection therebetween, said shoe member having a groove cooperating with the curved portion of the liner to form a screw receiving bore, a locking screw in said bore and adapted to force said shoe away from the curved portion of the liner, the threads on said screw having a pitch line parallel to the screw axis and the tops of said threads being progressively and increasingly flattened off approaching the leading end of the screw, said shoe groove having threads complementing the threads on the locking screw.

4. In an inserted blade cutter, a body having a blade slot, a blade in the slot, a recess in said body at one side of said slot and breaking thereinto, a hardened steel liner snugly and resiliently fitted in said recess and being of substantially the same shape as said recess, the axes of said recess and liner being inwardly convergent to the plane of the blade, a shoe member in said recess, means slidably connecting said liner and shoe, said liner and shoe cooperating to form a bore, and an actuating element in said bore for forcing said shoe into binding engagement with said blade.

5. The combination of a tool body provided with a blade slot and a recess adjacent to and open to the blade slot, a blade in said slot, a blade clamping unit in said recess comprising a substantially U-shaped member, a shoe bridging the free end portions of the arms of said U-shaped member and having a groove cooperating with the curved portion of said member to form a bore, an actuating element in said bore and operative to move said shoe away from the curved portion of said member into clamping engagement with said blade, and means slidably connecting said member and shoe.

6. The combination of a tool body provided with a blade slot and a recess adjacent to and open to the blade slot, a blade in said slot, a blade clamping unit in said recess comprising a substantially U-shaped member, a shoe having a groove cooperating with the curved portion of said member to form a bore, an actuating wedge in said bore and operative to move said shoe away from the curved portion of said member into clamping engagement with said blade, and means slidably connecting said member and shoe.

7. The combination of a tool body provided with a blade slot and a recess adjacent to and open to the blade slot, a blade in said slot, a substantially U-shaped liner in said recess and having substantially parallel arms, a shoe member disposed between the arms of the liner and having a groove cooperating with the curved portion of the liner to form a plug receiving bore, an actuating plug in said bore and adapted to force said shoe away from the curved portion of the liner into clamping engagement with said blade, and cooperating means on said shoe and liner providing an interlocking slidable connection.

8. The combination of a tool body provided with a blade slot and a recess adjacent to and open to the blade slot, a blade in said slot, a blade securing device in said recess comprising a substantially U-shaped liner having substantially parallel arms, a shoe member disposed between and slidably connected to the arms of the liner and having a groove cooperating with the curved portion of the liner to form a plug receiving bore, and a tapered screw plug in said bore adapted to force the shoe away from the curved portion of the liner into binding engagement with the blade, said shoe groove having threads complementing the threads on the tapered screw plug.

9. The combination of a tool body provided with a blade slot and a recess adjacent to and open to the blade slot, a blade in said slot, a blade securing device in said recess comprising a substantially U-shaped liner having substantially parallel arms, a shoe member disposed between the arms of the liner and having a groove cooperating with the curved portion of the liner to form a plug receiving bore, and a tapered screw plug in said bore adapted to force the shoe away from the curved portion of the liner into clamping engagement with the blade, said shoe groove having threads complementing the threads on the tapered screw plug, and means operatively connecting the liner arms and shoe while permitting relative sliding movement therebetween.

ROBERT W. THOMAS,
FLORENCE G. MILLER,
*Executors of the Estate of Frank P. Miller, Deceased.*

REFERENCES CITED

The following references are of record in the file of this patent:

UNITED STATES PATENTS

| Number | Name | Date |
| --- | --- | --- |
| 430,148 | Prillwitz | June 17, 1890 |
| 1,251,140 | Van Der Horn | Dec. 25, 1917 |
| 1,011,107 | Blood | Dec. 5, 1911 |
| 1,190,197 | Shimer | July 4, 1916 |
| 1,681,675 | Miller | Aug. 21, 1928 |
| 1,687,891 | Ray | Oct. 16, 1928 |
| 2,128,571 | Miller | Aug. 30, 1938 |
| 1,756,986 | Miller | May 6, 1930 |
| 1,951,100 | Miller | Mar. 13, 1934 |
| 2,209,174 | Sheldrick | July 23, 1940 |
| 2,331,555 | Jostich, Jr., et al. | Oct. 12, 1943 |

FOREIGN PATENTS

| Number | Country | Date |
| --- | --- | --- |
| 543,872 | France | Sept. 11, 1922 |